(No Model.)

E. B. DRUMMOND.
CONVERTIBLE HEEL AND SOLE SHAVE.

No. 351,428. Patented Oct. 26, 1886.

Witnesses
M. E. Fowler
W. F. Bernhard

Inventor
Ernest B. Drummond
By his Attorneys
C. A. Snow & Co.

UNITED STATES PATENT OFFICE.

ERNEST B. DRUMMOND, OF MASSIE'S MILLS, VIRGINIA, ASSIGNOR OF ONE-HALF TO J. T. DRUMMOND, OF SAME PLACE.

CONVERTIBLE HEEL AND SOLE SHAVE.

SPECIFICATION forming part of Letters Patent No. 351,428, dated October 26, 1886.

Application filed June 11, 1886. Serial No. 204,862. (No model.)

*To all whom it may concern:*

Be it known that I, ERNEST B. DRUMMOND, a citizen of the United States, residing at Massie's Mills, in the county of Nelson and State of Virginia, have invented a new and useful Improvement in Convertible Heel and Sole Shaves, of which the following is a specification.

My invention relates to an attachment for heel-shaving implements used by shoe-makers and others for trimming the heel of a shoe; and it consists of the peculiar construction and adaptation of parts for service, substantially as hereinafter fully set forth, and specifically pointed out in the claim.

The object of my invention is to provide an attachment to implements of the class above named whereby they may be used for trimming the sides of the soles of boots and shoes, and which will obviate the danger of cutting or otherwise damaging the shoe-upper, to provide an attachment which can be easily and readily adjusted on the implement to adapt the latter for use by either a right or left handed operator, and to provide such a device which will be very cheap and inexpensive of manufacture, simple, strong and durable in construction, and easily and readily applied and detached.

Figure 1:
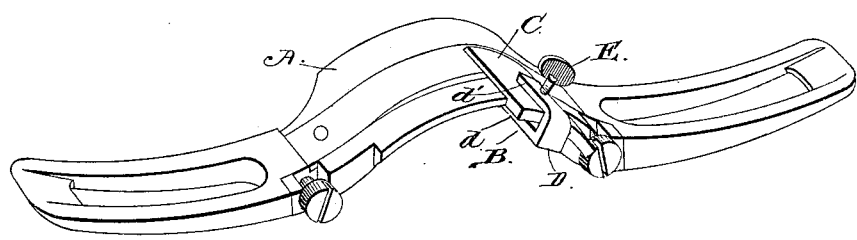
Figure 2:
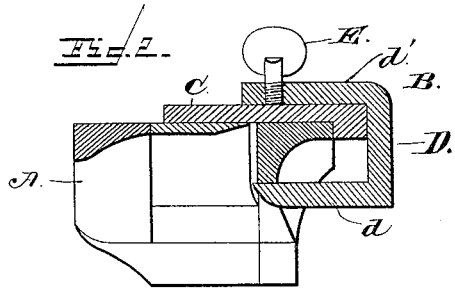
Figure 3:
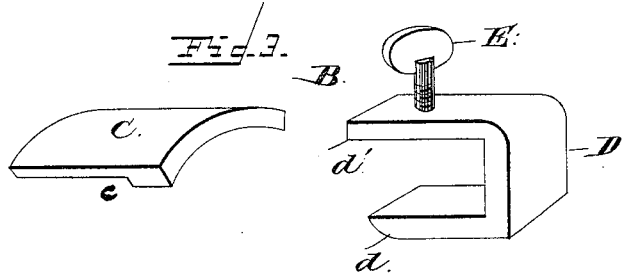

In the accompanying drawings, which illustrates an attachment for heel-shaving implements embodying my invention, Figure 1 is a perspective view of my invention adjusted for use upon the heel-shaving implement or tool. Fig. 2 is a vertical cross-sectional view through the implement and my improved attachment. Fig. 3 is a detached detail view of the attachment.

Referring to the drawings, in which like letters of reference denote corresponding parts in all the figures, A designates the heel-shaving implement, to which my improved attachment B is applied, which consists, essentially, of a guide, C, a clamp, D, and a binding-screw, E, which is carried by the clamp and retains the latter in proper position on the guide and the implement A.

No novelty is herein claimed on the implement A, as such device is in common and extensive use throughout the country by the trade; but the invention in this case is confined exclusively to the attachment whereby the implement is adapted for trimming the side edges of shoe-soles without danger of damaging the shoe-upper.

The guide C is made of a single piece of wood, metal, or other suitable material, and it is made concavo-convex in form preferably, the concave side thereof corresponding to the convex side of the implement A, over and on which the guide is adapted to fit snugly, so as to be prevented from lateral displacement, and permit its ready adjustment longitudinally thereon, to permit the device with the attachment to be used by either a right or left handed person by shifting the attachment from one side to the other of the implement or tool. The guide C is provided at or near one end with an enlarged portion, which projects below the lower surface thereof and forms a shoulder or ledge, $c$, which bears against the edges of the implement or tool A, and serves to prevent the guide from movement transversely of the implement A.

The clamp D of the attachment B is provided at one end with a right-angled arm, $d$, that takes under and bears against the concave side of the implement or tool A, and at its other end the clamp is further provided with a similar right-angled arm, $d'$, which bears on or against the upper or convex side of the guide C, the arm $d'$ being provided with a transverse threaded opening, through which works the threaded shank of a binding-screw, E, that bears on the guide C and clamps the latter and the clamp D to the tool or implement A.

The manner of using my invention is obvious from the foregoing description, taken in connection with the drawings. The guide is first properly fitted against the convex side of the implement A, so that its shoulder $c$ bears against the edge of the tool, and the clamp D is then fitted over the tool and the guide, and the binding-screw turned to bear on the guide, and thus detachably connect the parts together.

The invention can be easily and readily applied and detached from the implement with great ease and facility, and it is very simple and cheap.

The style of shaving implement shown in the accompanying drawings is known in the trade as the "Snell and Artherton heel-shaving device." By my attachment the workman can instantly convert the heel-shaving implement into an edge plane or shave for shaving the sole of the shoe, thus avoiding the necessity of purchasing two sets of tools for doing this work.

As shown in Fig. 1, the attachment is adjusted for use by a left-handed person. By loosening the screw E and sliding the attachment toward the handles on the other side the same device can be used by a right-handed person.

Having thus described my invention, what I claim as new, and desire to secure by Letters Patent, is—

In combination with the heel-shaving implement, comprising the two handles and intermediate cutting portion, the attachment for converting said implement into an edge or sole shave, said attachment consisting of a guide, C, provided with a flange, c, to catch around that edge of the cutting portion which is opposite the cutting-edge, and a clamp, D, clamping the flanged edge of the guide C and holding it to the cutting portion of the heel-shaver, and a binding-screw, E, for the clamp, as set forth.

In testimony that I claim the foregoing as my own I have hereto affixed my signature in presence of two witnesses.

ERNEST B. DRUMMOND.

Witnesses:
B. T. GORDON,
E. L. KIDD.